(No Model.)
W. E. SPANGLE.
BELT REEL.
No. 325,986. Patented Sept. 8, 1885.
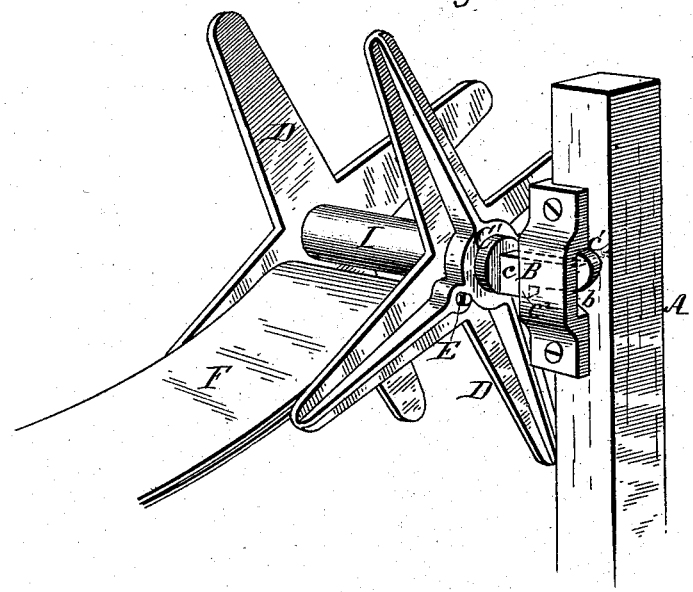
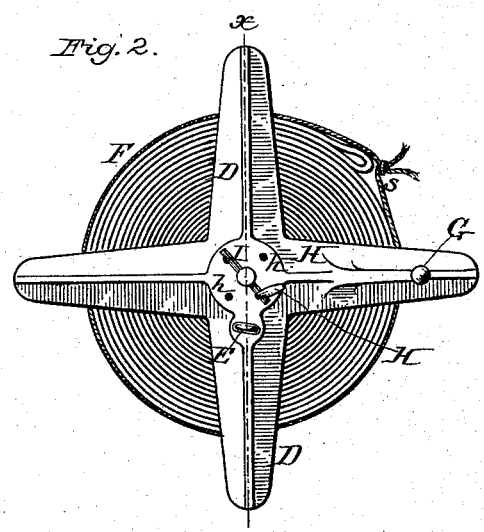
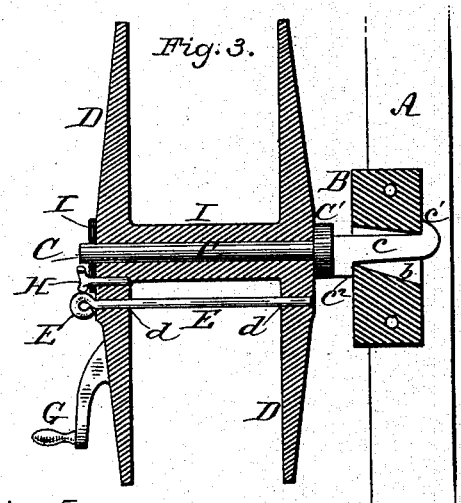
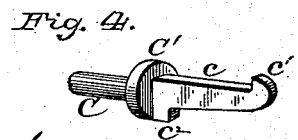
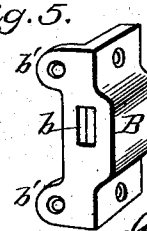
Attest:
R. E. Grant
W. F. Chaffer
Inventor:
William E. Spangle
by his Attorneys
Johnson and Johnson

UNITED STATES PATENT OFFICE.

WILLIAM E. SPANGLE, OF LIMA, WISCONSIN.

BELT-REEL.

SPECIFICATION forming part of Letters Patent No. 325,986, dated September 8, 1885.

Application filed April 25, 1885. (No model.)

*To all whom it may concern:*

Be it known that I, WILLIAM E. SPANGLE, a citizen of the United States, residing at Lima, in the county of Rock and State of Wisconsin, have invented new and useful Improvements in Belt-Reels, of which the following is a specification.

My invention relates to an improvement in reels for machine-belting; and it has for its object to provide a simple and cheap device for readily attaching and detaching the reel from machines operated from an independent motor by an endless belt, to wind such belt and prevent its stretching and exposure to the weather when the machine is not in operation, and to afford an easy means for winding the belt for transportation.

This device is particularly adapted for use in connection with agricultural machines and such machines as are used in the fields, and most particularly is it designed to be applied to thrashing-machines. The reel can also be used for ordinary purposes for which it is common to apply reels, such as coiling rope, wire, hose, &c., for shipping. These objects I attain by the construction shown in the accompanying drawings, in which—

Figure 1 represents a perspective view of my improved reel as supported on a part of the machine-framing, showing a belt in position for winding; Fig. 2, a side elevation showing belt wound; Fig. 3, a vertical longitudinal section on the line $x\ x$ of Fig. 2. Figs. 4 and 5 are details.

In the drawings, A represents a standard or upright post, or part of a machine to which it is designed to attach my improved reel device.

A casting, B, having an oblique slot, $b$, formed therein, is attached to the standard A by screws or nails passing through it on either side of the slot and through a side flange, $b'$.

A spindle, C, having a shoulder, C', and an arm, $c$, provided with a hooked end, $c'$, and a shoulder, $c^2$, on its under side, fits into the oblique slot in the casting, the hooked end and shoulder forming retaining-points to hold the spindle to place in the socket-casting; but the spindle may be readily detached from the holding-socket by tilting the reel upward, when the hooked end $c'$ will be disengaged from the casting and the reel-spindle may be withdrawn.

Mounted on the spindle is a reel, D, having a tubular windlass or hub, I, joining its arms, one set of which have coincident openings $d$, through which a pin or rod, E, passes, which serves as a means to secure an endless belt, F, to the reel, by passing the pin through the looped end of the belt, as indicated in Fig. 1.

A crank, G, attached to one of the reel-arms, serves as a means to rotate the reel on its spindle to wind the belt, and a set-screw or pin, H, passed in one of a series of holes, $h$, in the side of the reel, engages a pin, I, passing transversely through the end of the spindle to lock the spindle and reel and prevent unwinding of the belt. The pin I, in connection with the shoulder C', prevents the reel having any longitudinal movement on the spindle.

In practice, when it is desired to wind the belt of a machine and not remove the reel therefrom, one end of the belt is looped over the pin E, and by turning the crank the belt will be wound upon the reel-hub, and when so wound the pin H is inserted into the proper hole $h$, to prevent the unwinding of the belt, and the latter is then tied upon the reel-hub, a cord or strap, $s$, passing around the same, as shown in Fig. 2.

The belt-reel will be used mostly for thrashing-machines. Where portable engines are used, the object is to save time and labor, as well as furnishing a good place to carry the belt in case of moving the machine from place to place. In using this reel device as an attachment to the machine the belt will last much longer, as it obviates rolling it on the ground and in the mud.

To complete the device, it is only necessary to provide a reel as shown and described and the slotted casting B, and the latter can be fastened to any suitable place or to any part of the machine, so that the reel may be mounted therein without permanent fastening and carried as an attachment of the machine.

In the operation of winding the belt is removed from its pulleys; or, if there should be a pulley on the machine near the reel and in line with it, one end of the belt may be placed on said pulley and the belt held upon the latter and upon the reel, in which case the provision for locking the latter is important.

I claim—

1. The combination, with a frame-support and a casting attached thereto having an oblique slot formed therein, of a reel-spindle having its end fitted to said slot, and provided with a hooked termination and a shoulder, substantially as shown, and for the purpose described.

2. The combination, with a reel and its carrying-spindle, of a pin, E, passing through its arms, substantially as and for the purpose set forth.

3. The combination, with a reel provided with an adjustable stop, H, on one of its sides, and a reel-carrying spindle, of a pin, I, passing transversely through the reel-spindle to engage said stop, as and for the purpose described.

4. The combination, with a reel having a series of openings in its side arranged around its axial line of rotation, and a spindle provided with a pin, I, passing transversely therethrough, of a set-screw, H, to enter one of said openings and contact with the pin of the spindle, as and for the purposes set forth.

5. In combination with a spindle detachably connected to a frame-support, of a reel detachably mounted on said spindle, and a pin, I, passing through said spindle to hold the reel in place, and an adjustable stop, H, connected with the reel to contact with the pin, whereby the movement of the reel is limited, as and for the purposes described.

6. In combination with a reel, a spindle, and a rod passing through the reel-arms, of an adjustable stop connected with the side of the reel, and a pin passing through the spindle to engage said stop, substantially as shown, and for the purpose described.

In testimony whereof I have hereunto set my hand in the presence of two subscribing witnesses.

WILLIAM E. SPANGLE.

Witnesses:
 ZINA BROWN,
 J. B. CLARKE.